D. W. SMITHERS.
STRAINER.
APPLICATION FILED AUG. 30, 1915.
1,181,806.
Patented May 2, 1916.
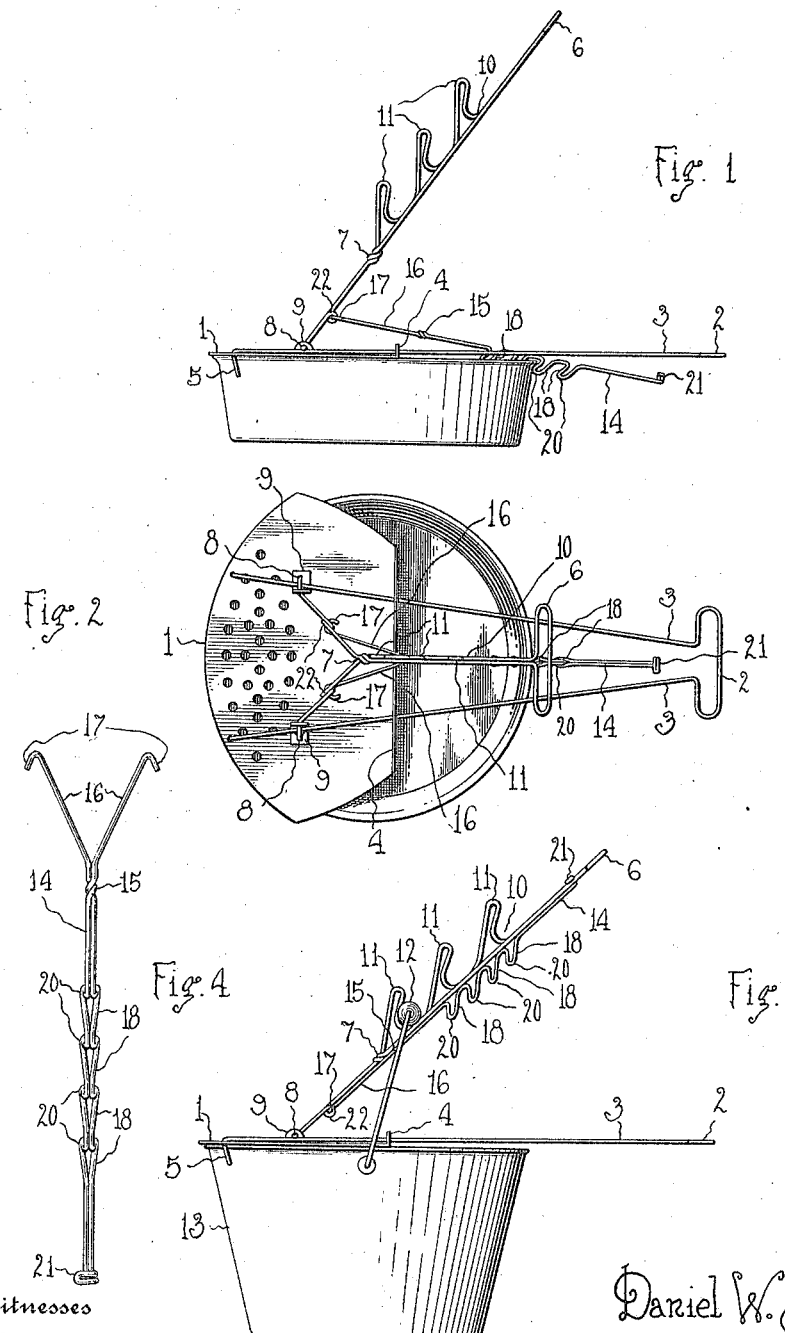

UNITED STATES PATENT OFFICE.

DANIEL W. SMITHERS, OF DETROIT, MICHIGAN.

STRAINER.

1,181,806.  Specification of Letters Patent.  Patented May 2, 1916.

Application filed August 30, 1915. Serial No. 47,960.

*To all whom it may concern:*

Be it known that I, DANIEL W. SMITHERS, a citizen of the United States of America, residing at Detroit, in the county of Wayne and State of Michigan, have invented certain new and useful Improvements in Strainers, of which the following is a specification, reference being had therein to the accompanying drawings.

This invention relates to a cover strainer and to an arrangement thereof whereby it may be applied either to a kettle or a vessel with bail, or a receptacle without bail, the strainer acting as lifter and enabling the user to escape from contact with steam that rises from the vessel while it is in pouring position.

The invention consists in the matters hereinafter set forth, and more particularly pointed out in the appended claims.

Referring to the drawings, Figure 1 is a view in elevation of a strainer that embodies features of the invention applied to a vessel without a bail; Fig. 2 is a plan view of the strainer and vessel; Fig. 3 is a view in elevation of the strainer applied to the vessel with bail, and Fig. 4 is a view in detail of a clamping member.

In the drawings, a perforated sheet metal plate 1 arranged to partially cover and closely conform to a round receptacle, the perforations being near the outer edge thereof, is provided with a handle consisting of a wire or rod bent between its ends to form a hand grip 2 from which divergent arms 3 extend through openings in an upturned flange 4 along the rear margin of the plate, the forward end portions 5 of the arms being downturned and bent backwardly and passed through suitable openings in the plate.

Another bar is bent between its ends to form a handle 6 of appropriate shape with arms extending forwardly therefrom and twisted together or otherwise secured as indicated at 7 and then spread with the outer end portions 8 extending through the upturned ears of lugs 9 appropriately riveted to the plate 1 and overlying the divergent arms 3 of the main handle 2. The arm 10 is bent to form a series of projecting hooks indicated at 11 over which a bail handle as indicated at 12 may be brought. When the handle 6 is raised in such position as indicated in Fig. 3, the engaged hook 11 and the depending tongues 5 overlying the margins of a kettle 13, as indicated, firmly support the kettle by the handle 6 while the handle 2 permits the user to swing or agitate the receptacle as desired.

A clamping member 14 is formed of a bar bent between its ends into parallel substantially contactual relation, the arms being twisted together, as indicated at 15, with outer divergent portions 16 and hooks 17 on the ends thereof adapted to pass through eyelets 22 formed in the handle 6. The arms 14 are bent to form a series of depending hooks 18, to engage over the flange of a vessel as indicated in Figs. 1 and 2. To further aid in gripping a vessel to carry, the arms 14 are slightly separated at the crests 20 of the hooks as indicated in Fig. 4.

At the outer end of the clamping member, the arms 14 are bent upwardly and transversely into a hook as indicated at 21 whereby they may be held against the underside of the handle 6 as indicated in Fig. 3 when the instrument is used on a bail or handled vessel.

When the device is applied as in Figs. 1 and 2 to a flanged vessel the tongues 5 and hooks 18 coöperate to firmly grip and lift the vessel, the operator holding the handles 6 and 2 spread apart, as indicated, and the vessel of its own weight swinging into pouring or straining position while steam escapes upwardly between the handles and therefore does not affect the hands of the user. A strainer is thereby obtained which is usable not only with bailed vessels but with others that do not have handles, the strainer being applied on a bailed vessel even over a cover which may be slipped partly to one side.

Obviously changes in the details of construction may be made without departing from the spirit of the invention and I do not care to limit myself to any particular form or arrangement of parts.

What I claim is:—

1. A cover strainer comprising a perforated plate, a bar bent between its ends to form a handle portion with divergent arms passing through an upturned flange on the rear margin of the plate and having downturned end portions extending through openings in the plate and forming depending tongues, a handle bar pivoted at its ends to the plate handle to swing upwardly therefrom, hooks on the handle bar adapted to engage the bail of the vessel bearing against the tongue, a clamping member comprising a bar bent between its ends to form a handle grip with contacting arms having divergent end portions that engage eyelets formed in the handle bar, the arms being bent to form a series of depending hooks, and a clamping member pivoted to the handle bar between the ends thereof to move toward the tongues when the bar is raised, and hooks formed from the member adapted to coöperate with the tongues to engage a vessel by the rim.

2. A cover strainer comprising a perforated plate having an upturned rear margin, a handle comprising a bar bent between its ends to form a hand grip with divergent arms extending through apertures in the flange with downturned end portions thrust through openings in the plate to form depending tongues, a handle bar comprising a rod bent between its ends to form a hand grip with contacting arms extending therefrom secured together near their outer divergent portions that pass through holding members on the plate and overlie the adjacent portions of the handle, one of the arms of said handle bars being bent upwardly to form a series of hooks adapted to engage the bail of a vessel adapted to bear against the tongues, a clamping member comprising a bar bent between its ends to form a pair of contacting arms the end portions of which constitute the hooks engaging over the handle bar, the outer end portion being spread and engaging in eyelets of the divergent portions of the handle bar, the arms being bent into a series of depending hooks that are adapted to coöperate with the tongues to grip an inclosed vessel by the rim.

In testimony whereof I affix my signature in presence of two witnesses.

DANIEL W. SMITHERS.

Witnesses:
ANNA M. DORR,
C. R. STICKNEY.

Copies of this patent may be obtained for five cents each, by addressing the "Commissioner of Patents, Washington, D. C."